United States Patent [19]

Kim

[11] Patent Number: 5,779,308
[45] Date of Patent: Jul. 14, 1998

[54] LOCKING APPARATUS OF A FOLDING SEAT FOR VEHICLES

[75] Inventor: Yeong-Wook Kim, Woolsan, Rep. of Korea

[73] Assignee: Hyundai Motor Company, Seoul, Rep. of Korea

[21] Appl. No.: 761,315

[22] Filed: Dec. 6, 1996

[30] Foreign Application Priority Data

Dec. 8, 1995 [KR] Rep. of Korea .................... 95-47698

[51] Int. Cl.$^6$ ........................................................... A47C 1/02
[52] U.S. Cl. ........................... 297/336; 297/331; 296/65.1; 296/68.1
[58] Field of Search ............................ 297/336, 326, 297/331, 335, 378.12, 378.13; 296/65.1, 68.1

[56] References Cited

U.S. PATENT DOCUMENTS

| | | | |
|---|---|---|---|
| 4,008,919 | 2/1977 | Muraishi | 297/331 |
| 4,993,776 | 2/1991 | Acuto et al. | 297/336 X |
| 5,641,202 | 6/1997 | Rus | 297/336 X |

*Primary Examiner*—Laurie K. Cranmer
*Attorney, Agent, or Firm*—Christie, Parker & Hale, LLP

[57] ABSTRACT

A locking apparatus of folding seat for vehicles by which a folding seat can be automatically and stably locked by a locking apparatus when a passenger is seated on a rear seat and, when the passenger leaves the seat, the folding seat can be automatically released of its locking, the apparatus comprising:

- a load detecting plate disposed for vertical movement at a support frame of a rear seat cushioning unit rotatatively mounted through the medium of a front hinge;
- a manipulating plate disposed in contact with the load detecting plate to receive a descending motion of the load detecting plate for a rotation to one direction and so mounted as to return to an original position by resilient restoring force of a return spring;
- a lock so disposed as to receive a rotary movement of the manipulating plate under a state of being contacted with the manipulating plate and to be rotated thereby, and so mounted as to return to the original position by the resilient restoring force of the return spring; and
- a hook releasably coupled to the lock to thereby be mounted to a floor panel so that the rear seat can be secured to the floor panel.

5 Claims, 5 Drawing Sheets

LOCKING APPARATUS OF A FOLDING SEAT FOR VEHICLES

BACKGROUND OF THE INVENTION

1. Field of the Invention

The present invention relates to a folding seat of a vehicle, and more particularly to a locking apparatus of a folding seat for vehicles by which a folding seat can be automatically and securely locked by a locking apparatus when a passenger is either seated or away from the folding seat, and the lock of the folding seat can be automatically released.

2. Description of the Prior Art

Generally a vehicle such as wagon, mini-van or the like, is provided with a cargo accommodation space at the side of the rear seat and in order to have even more space, to accommodate more baggage and the like, the rear seat is designed to be forwardly folded.

In other words, when the rear seat is forwardly folded, the space occupied by the rear seat becomes vacant, which is turn is connected to the cargo accommodation space arranged in the back of the rear seat to thereby provide a more spacious area thereto.

A rear seat according to the prior art designed to be forwardly folded is rotatatively mounted to the body of a vehicle by a hinge.

In other words, illustrated in FIG. 1, a rear seat 100 includes a cushioning unit 101 having an appropriate elastic force and a back unit of a chair rotatatively coupled to a rear end of the cushioning unit 101.

The cushioning unit 101 is mounted to a floor panel 103 of the body of the vehicle and a front lower tip end of the cushioning unit 101 is rotatatively mounted to the floor panel 103 by hinge 104.

When a back unit 102 of the rear seat is folded toward the cushioning unit 101, which is in turn forwardly folded by hinge 104, the space formerly occupied by the rear seat becomes a vacant area, which is now connected to the cargo accommodation space, so that the cargo accommodation space is relatively enlarged to as much space as was previously occupied by the rear seat.

Furthermore, when a passenger is in rear seat a locking apparatus is provided to releasably secure the rear seat to the floor panel, where the locking apparatus is employed by a lock 105 protrudingly arranged toward the cushion unit at the floor panel of the body adjacent to a rear portion of the cushioning unit, and a hitching hole 106 is symmetrically formed at a lower portion of the cushioning unit against the lock so that the lock 105 can be releasably coupled to the cushioning unit.

Accordingly, when the rear seat is rotated toward the floor panel around the hinge in order for the passenger to be seated the lock is inserted into the hitching hole of the cushioning unit to thereby cause the rear seat to maintain a state of being secured to the body by the lock.

However, there is a problem in the rear seat locking apparatus according to the prior art thus constructed in that, when the lock 105 is hitched by the hitching hole of the cushioning unit 101, the hitching 106 is symmetrically arranged in position thereby against the lock 105 and the cushioning unit is forcibly pressed downward to couple the lock thereto, so that, if an arrangement of the position between the hitching hole 106 and the lock is not realized in an appropriate way, the lock 105 is loosely inserted into the hitching hole 106 to thereby prevent a tight locking and to possibly cause the lock to be pressed by the cushioning unit into a deformed or broken shape thereof.

There is another problem in that the force to forcibly press the cushioning unit downward tends to become enormous.

There is still another problem in that, when an inertia force of motion generated in the running of a vehicle is applied to the rear seat in a state where the lock 105 is hitched by the hitching hole 106 of the cushioning unit, the lock 105 might be separated from the hitching hole 106 and the rear seat 100 can be unstably secured to the floor panel 103 to thereby harm a passenger seated in the rear seat.

SUMMARY OF THE INVENTION

Accordingly, the present invention is provided to solve the aforementioned problems and it is an object of the present invention to provide a locking apparatus of folding seat for vehicles by which, when a passenger is seated on a rear seat, the rear seat is automatically and stably secured to a floor panel by the weight of the passenger to thereby cause the rear seat to be locked simply and without any difficulty, and when the passenger leaves the rear seat, the rear seat is automatically released of its locking to thereby allow the rear seat to be conveniently folded forwardly, and, even though an inertia force of motion is applied to the rear seat in a state where the rear seat is locked, there is no fear of the rear seat being released of locking thereof.

In accordance with the objects of the present invention, there is provided a locking apparatus for a folding seat for vehicles, the apparatus comprising:

a load detecting plate disposed for vertical movement at a support frame of a rear seat cushioning unit rotatatively mounted by a front hinge;

a manipulating plate disposed in contact with the load detecting plate to receive a descending motion of the load detecting plate for rotation in one direction and mounted so as to return to an original position by the resilient restoring force of a return spring;

a lock so disposed as to receive a rotary movement of the manipulating plate under a state of being contacted with the manipulating plate and to be rotated thereby, and mounted so as to return to the original position by the resilient restoring force of the return spring; and a hook releasably coupled to the lock to thereby be mounted to a floor panel so that the rear seat can be secured to the floor panel.

BRIEF DESCRIPTION OF THE DRAWINGS

For fuller understanding of the nature and objects of the invention, reference should be made to the following detailed description taken in conjunction with the accompanying drawings in which.

DETAILED DESCRIPTION OF THE INVENTION

According to the preferred embodiment of the present invention, a mounted bracket is securely attached to both lateral ends of the support frame, and one tip end of a plurality of return springs is securely connected to the mounted bracket.

The other tip end of the return spring is connected to the load detecting plate so as to resiliently support the load detecting plate.

Furthermore, at a rear end of the support frame, there is securely attached a fastening bracket to the mounted bracket.

The fastening bracket is formed with two pairs of flanges, where one pair of flanges is fastened by the manipulating plate and the return spring thereof by a pin. One pair of flanges at the fastening bracket is fastened by the lock and the return spring thereof by a pin. The load detecting plate is integrally and extensively formed at a rear end thereof with a pressing protruder.

The pressing protruder is disposed to touch one tip end of the manipulating plate.

The manipulating plate contacts at the other tip end thereof a tip end bendily formed at the lock, which is formed with a hitching hole where a tip end of the hook can be releasably hitched.

Hereinafter, the preferred embodiment of the present invention will be described with reference to the accompanying drawings.

Figure 1:
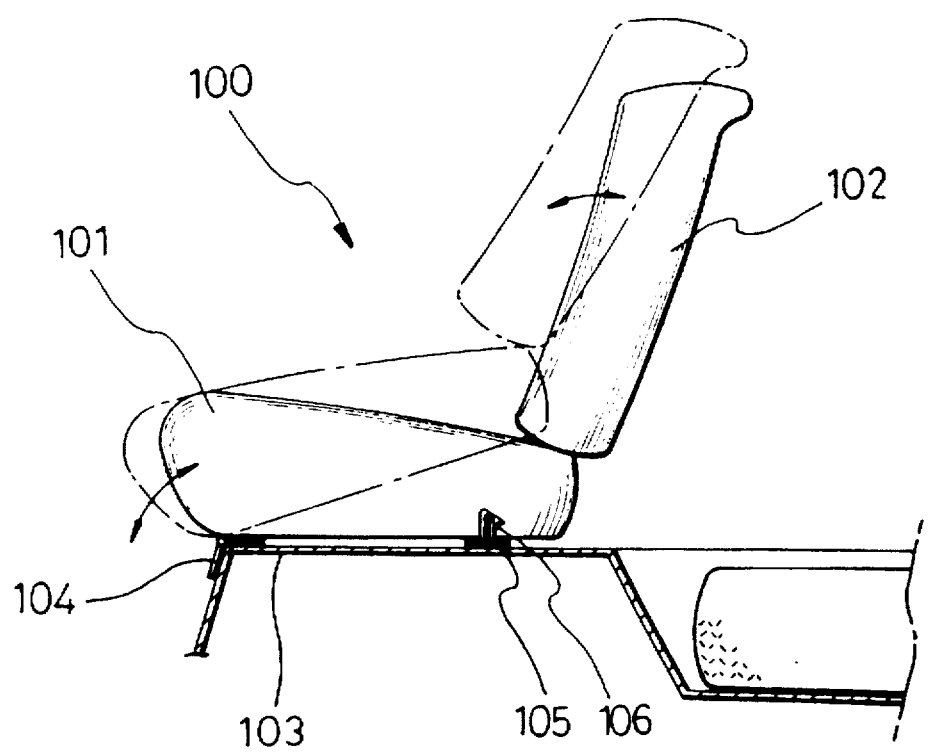
FIG. 1 is a side view for illustrating a locking apparatus mounted to a folding seat of a vehicle according to the prior art.
Figure 2:
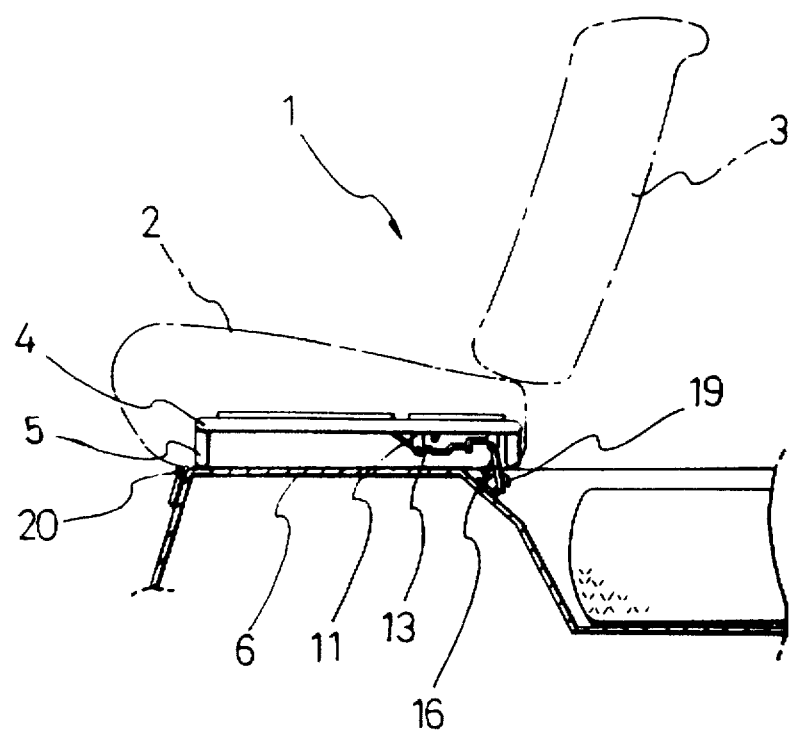
FIG. 2 is a side view for illustrating a locking apparatus mounted to a folding seat of a vehicle according to the present invention.

FIG. 2 is a side view for illustrating a locking apparatus mounted to a folding seat of a vehicle according to the present invention.

Figure 3:
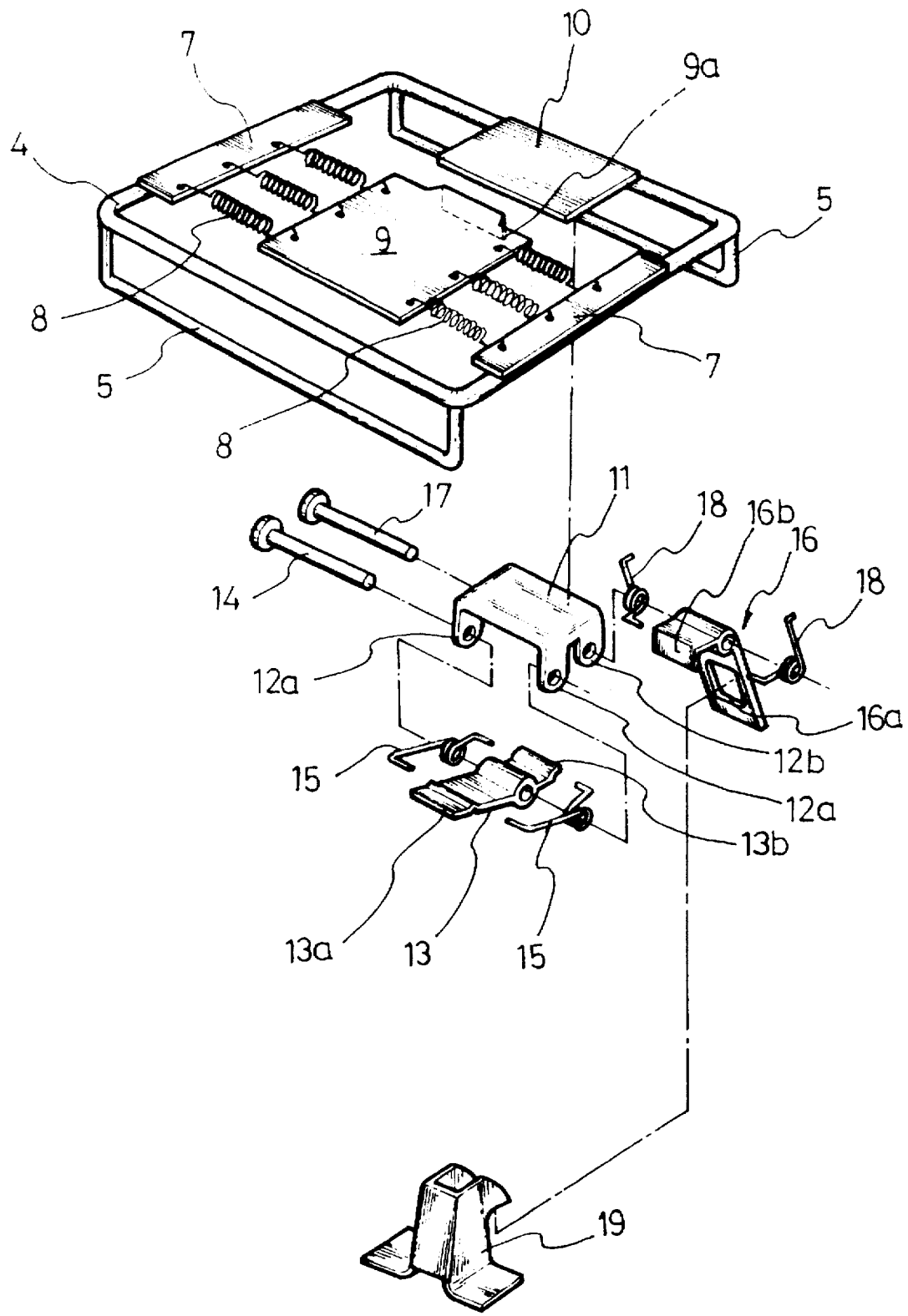
FIG. 3 is an exploded perspective view of the locking apparatus mounted to the folding seat of the vehicle according to the present invention.

FIG. 3 is an exploded side view of the locking apparatus mounted to the folding seat of the vehicle according to the present invention.

In other words, a rear seat 1 according to the present invention includes a cushioning unit 2 having an appropriate elastic force and the back of the seat rotatatively disposed at the rear end of the cushioning unit 2.

The cushioning unit 2 is internally formed with a four-angled support frame 4 to thereby support the cushioning unit at an appropriate level.

The support frame 4 is integrally and extensively formed at a front end thereof and at a rear end thereof with a supporting leg unit 5 in a vertical direction so that the cushioning unit can be supported on floor panel 6 of the body of the vehicle by the support leg unit 5.

The support frame 4 maintains a predetermined spacing from the floor panel by the support leg unit 5.

The support frame 4 is securely attached at both lateral ends thereof by the mounted bracket 7 to which each tip end of the plurality of return springs 8 is mounted.

The return spring is securely fixed at the other tip end thereof by a fiat-plated load detecting plate 9.

Accordingly, when a passenger is seated on the cushioning unit 2, the weight of the passenger is transmitted to the load detecting plate 9 through the cushioning unit, so that the load detecting plate 9, in a state of being resiliently supported to the return spring, is pressed downwardly by the weight of the passenger to thereby elongate the return spring 8.

When the passenger leaves the seat, the weight of the passenger which was applied to the load detecting plate 9 is no longer there so that the load detecting plate returns to its original position by the resilient restoring force of the elongated return spring 8.

The support frame is securely attached at a rear end thereof by a mounted bracket 10 to which a fastening bracket 11 is fixedly mounted thereunder.

The fastening bracket 11 is integrally and extensively formed downwardly at both lateral ends thereof by two pairs of protruding flanges 12a and 12b.

Furthermore, one pair of flanges 12a at the fastening bracket is rotatatively inserted and supported by a manipulating plate 13 by pin 14.

The manipulating plate 13 is arranged at a front and rear side thereof with two pieces of return springs 15 which are fastened by pin 14 along with the manipulating plate 14.

The return spring 15 is hitched and fixed at both tip ends thereof by a bottom surface of the manipulating plate 15, and after a rotary movement of the manipulating plate, the manipulating plate 15 returns to its original position.

The other pair of flanges 12b at the fastening bracket 11 is rotatatively inserted and supported by a lock 16 having a hitching hole 16a through pin 17. The lock 16 is arranged at a front and rear side thereof with a return spring 18, which is fastened and inserted by the pin 17 along with the lock 16.

Figure 4A:
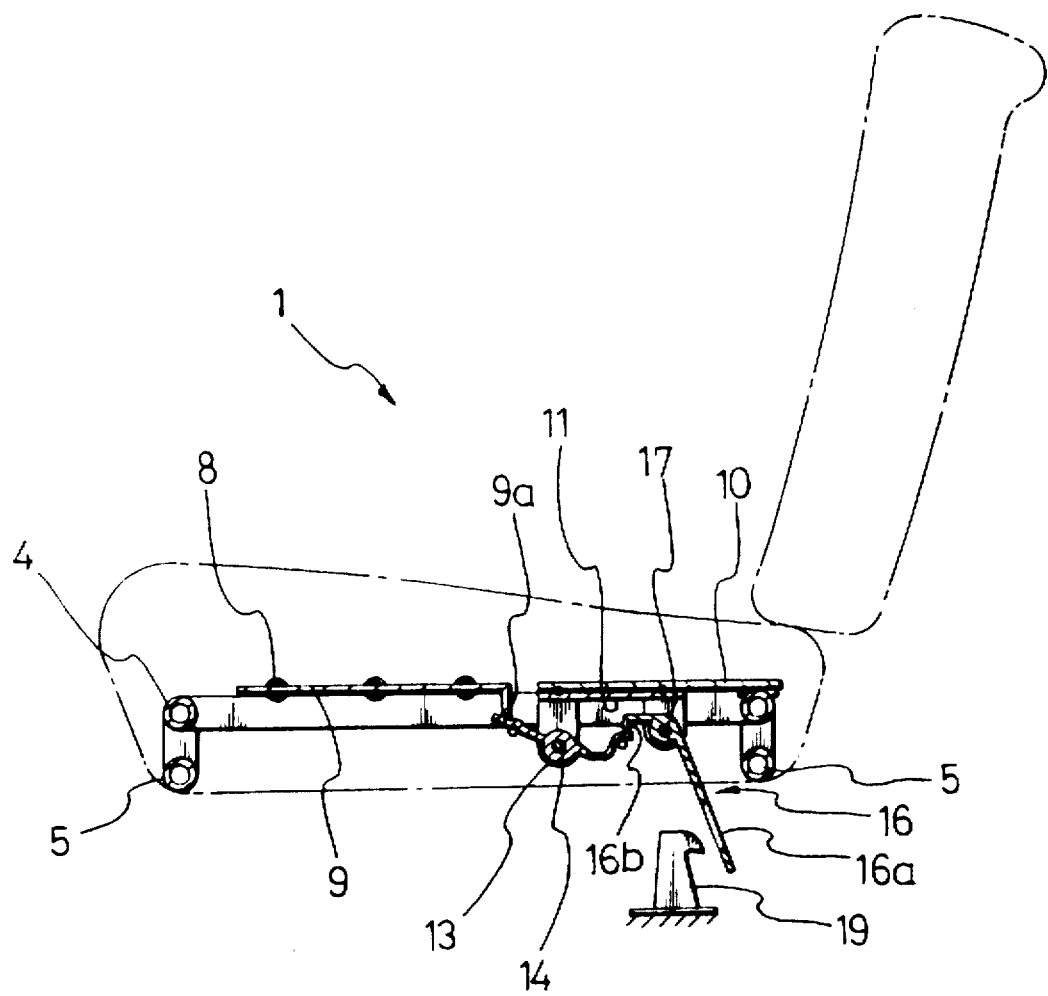
FIGS. 4A and 4B respectively, illustrate the operational state of the locking apparatus of the folding seat according to the present invention.

As illustrated in FIG. 4A in detail, when the passenger leaves the seat, the lock 16 is so supported that the lock 16 can manitain a slant position against the cushioning unit 2, and after the rotary movement of the lock 16, the lock 16 returns to its original position.

Furthermore, the floor panel adjacent lock 16 is securely attached by hook 19 to be releasably hitched by hitching hole 16a of the lock 16.

The load detecting plate 9 is integrally and extensively formed downwardly at a rear end thereof with pressing protruder 9a so as to be in touch with one tip end of the manipulating plate at an upper surface thereof.

Hereinafter, an operational effect of the embodiment according to the present invention will be described.

FIG. 4A is a side view for illustrating a state where a passenger is not seated on the rear seat mounted with a locking apparatus according to the present invention.

Under this state, the cushioning unit of the rear seat 1 is secured to the floor panel 6 through support leg unit 5 and pressing protruder 9a of the load detecting plate 9 maintains a state where it is in contact with an upper portion of a tip end 13a, while the other tip end 13b of the manipulating plate maintains a contact with one tip end of the lock 16 at a lower portion thereof and the lock 16 is slanted and extends from under the cushioning unit 2 to maintain a predetermined spacing from a rear portion of the hook 19.

In other words, in a state where a passenger is not seated on the rear seat, the lock attached to the rear seat is not hitched by the hook mounted at the floor panel, so that the rear seat can only be fastened to the floor panel through front hinge 20.

In this case, the rear seat rotates around the hinge just by folding the rear seat forwardly, and the space which was taken by the rear seat remains vacant, by which, a cargo accommodation space provided at the rear of the rear seat can be easily enlarged.

Figure 4B:
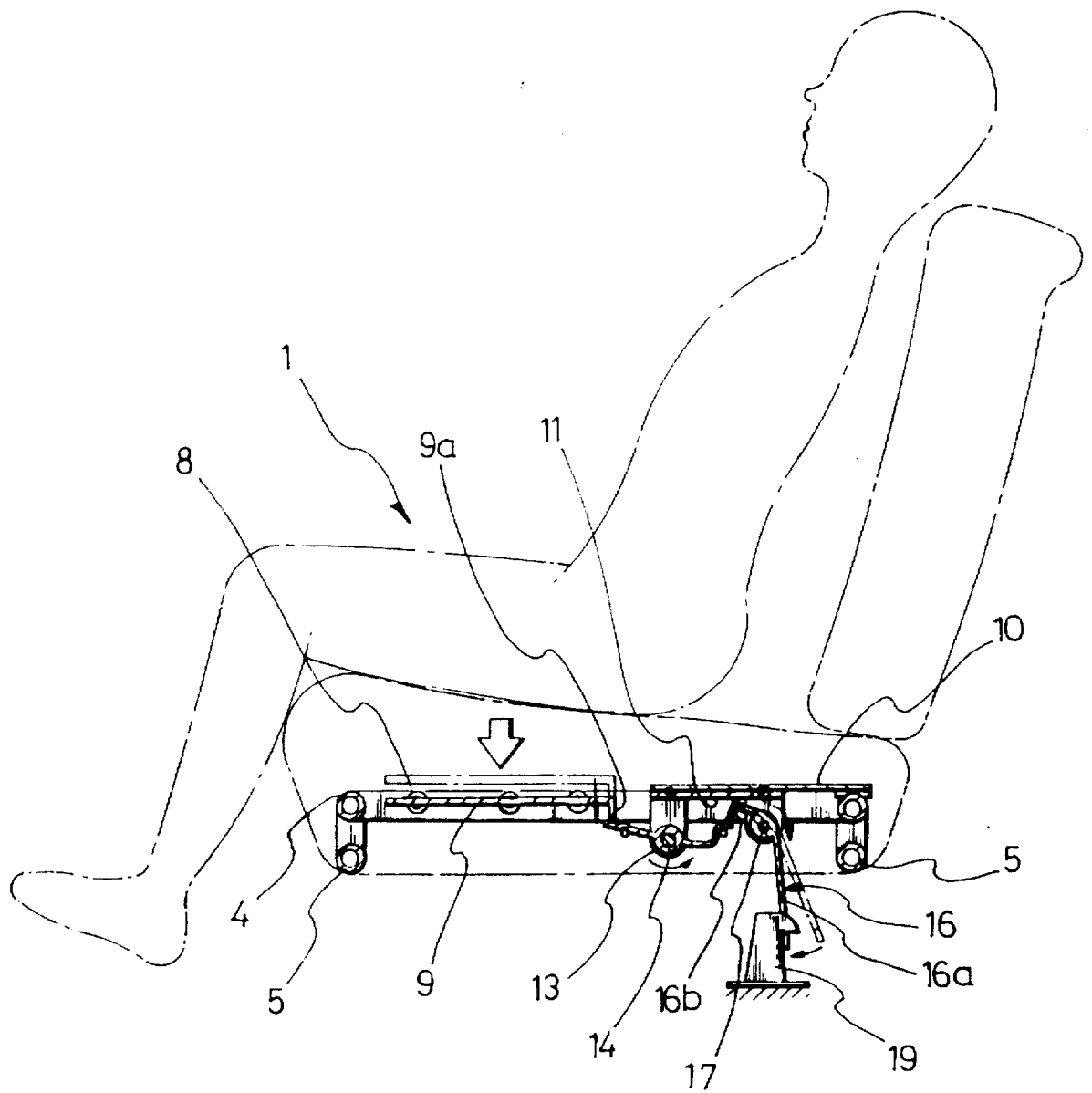

Meanwhile, under the above state, when a passenger is seated on the rear seat as illustrated in FIG. 4B, the cushioning unit 2 is pressed under by the weight of the passenger and the weight is transmitted to the load detecting plate 9.

Successively, the load detecting plate 9 is pressed by the weight of the passenger to elongate the return spring 8 and thereby be moved downwardly.

When the load detecting plate 9 is pressed downwardly by the weight of the passenger, the pressing protruder 9a formed at the rear end of the load detecting plate moves downwardly whereby the tip end 13a of the manipulating plate 13 which is in contact with the pressing protruder rotates counterclockwise by the pressing protruder 9a.

Furthermore, the other tip end 13b of the manipulating plate 13 rotates counterclockwise under a state where it touches tip end 16b of the lock 16 to thereby rotate the lock 16 clockwise.

The lock 16 is therefore rotated clockwise and a hitching hole 16a thereof is rotated toward the hook 19 mounted to the floor panel and the hook 19 is automatically hitched by the hitching hole 16a of the lock 16.

In other words, when a passenger is seated on the rear seat, the weight of the passenger is transmitted to the lock through the load detecting plate and through the manipulating plate, to thereby rotate the lock clockwise and to be hitched by the hook.

The rear seat is then automatically fixed to the floor panel by the lock and the hook.

Accordingly, the rear seat can be simply secured without extra manipulation.

Furthermore, the rear seat can be securely fixed to the floor panel by the lock and the hook, so that, even though inertia force of motion is transmitted to the lock and the hook during the operation of a vehicle, there is no problem of the hook and the lock being separated in coupling therebetween.

Meanwhile, under the above state, when the passenger leaves the seat, the lock 16 rotates counterclockwise by the resilient restoring force of the return spring 18 to thereafter be separated from the hook 19.

The manipulating plate 13 also rotates clockwise to the original position by the resilient restoring force of the return spring 15 while the load detecting plate 9 returns to its original position by the resilient restoring force of the return spring 8, as illustrated in FIG. 4A.

In other words, when a passenger leaves the seat, locking of the rear seat is automatically released, to thereby allow the rear seat to be simply folded without any separate maniptllation applied thereto.

As apparent from the foregoing, there is an advantage in the locking apparatus of folding seat for vehicles according to the present invention, in that, when a passenger is seated on a rear seat, a lock attached to the rear seat rotates by the weight of the passenger to thereby be hitched by a hook mounted to the floor panel and to be automatically and securely locked so that locking of the rear seat can be simply achieved without any difficulty.

There is another advantage in that, when an external force, such as inertial force of motion, occurs during operation of a vehicle and is applied to the rear seat, the rear seat does not separate from the floor panel because the rear seat is stably secured to the floor panel by the coupling between a lock and a hook.

There is still another advantage in that, when the passenger leaves the seat, the rear seat is automatically unlocked to thereby allow the rear seat to be folded forwardly and to allow a cargo accommodation space to be obtained easily.

What is claimed is:

1. A locking apparatus for a folding seat of a vehicle, the apparatus comprising:

a support frame for a rear seat cushioning unit, said rear seat cushioning unit being rotatably mounted to the vehicle by a front hinge, and said support frame having mounted brackets at lateral ends;

a load detecting plate disposed for vertical movement relative to the support frame, the load detecting plate being resiliently supported by a plurality of return springs, each of the return springs having one tip connected to the load detecting plate and another tip connected to one of the mounted brackets;

a manipulating plate disposed in contact with the load detecting plate and rotatable from an original position in response to a descending motion of the load detecting plate, said manipulating plate having a return spring to return the manipulating plate to its original position;

a lock disposed in contact with the manipulating plate and rotatable from an original position in response to the rotary movement of the manipulating plate, said lock having a return spring to return the lock to its original position; and a hook mounted to a floor panel of the vehicle and releasably coupled to the lock for securing the rear seat cushioning unit to the floor panel.

2. The apparatus as defined in claim 1 wherein said support frame further comprises a third mounted bracket at a rear end thereof, and further comprising a fastening bracket attached to the third mounted bracket, the fastening bracket being formed with two pairs of flanges, wherein one pair of the flanges is fastened to the manipulating plate and the manipulating plate return spring by a pin.

3. The apparatus as defined in claim 2 wherein the other pair of the flanges is fastened to the lock and the lock return spring by a second pin.

4. The apparatus as defined in claim 1 wherein the load detecting plate is integrally formed at a rear end with a pressing protruder extending therefrom, the pressing protruder being disposed in contact with one end of the manipulating plate.

5. The apparatus as defined in claim 1 wherein the lock is formed with a hitching hole for releasably hitching a tip end of the hook.

* * * * *

UNITED STATES PATENT AND TRADEMARK OFFICE
CERTIFICATE OF CORRECTION

PATENT NO.   : 5,779,308
DATED        : July 14, 1998
INVENTOR(S)  : Yeong-Wook Kim It is certified that error appears in the above-identified patent and that said Letters Patent is hereby corrected as shown below:

On the title page, Item [57],

Abstract, lines 8, 9, replace "rotatatively" with --rotatively--.
Column 1, line 24, replace "rotatatively" with --rotatively--.
Column 1, lines 28,32, replace "rotatatively" with --rotatively-- (both occurrences).
Column 1, line 59, after "hitching" insert --hole--.
Column 2, lines 29,30, replace "rotatatively" with --rotatively--.
Column 2, line 56, replace "invention." with -- invention; --.
Column 3, line 35, replace "rotatatively" with --rotatively--.
Column 3, line 51, replace "fiat-plated" with --flat-plated--.
Column 4, line 5, replace "rotatatively" with --rotatively--.
Column 4, line 16, replace "rotatatively" with --rotatively--.
Column 4, line 22, replace "manitain" with --maintain--.
Column 5, line 41, replace "maniptllation" with --manipulation--.

Signed and Sealed this

Twenty-ninth Day of June, 1999

*Attest:*

Q. TODD DICKINSON

*Attesting Officer*     Acting Commissioner of Patents and Trademarks